Figure 1:
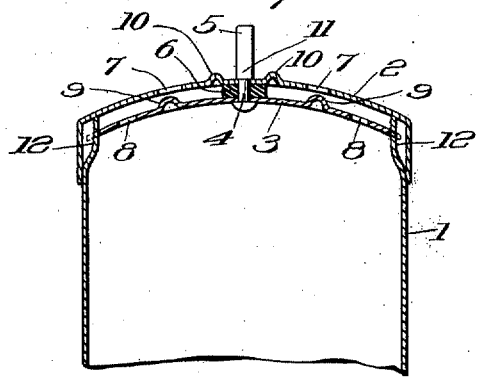

W. W. BEALS.
CONTAINER.
APPLICATION FILED MAR. 23, 1910.

985,322.

Patented Feb. 28, 1911.

Witnesses:
Allan H. Goose.
Marie F. Wainright.

Inventor
W. W. Beals,
By his Attorney
T. F. Bourne

THE NORRIS PETERS CO., WASHINGTON, D. C.

UNITED STATES PATENT OFFICE.

WALTON W. BEALS, OF NEW YORK, N. Y.

CONTAINER.

985,322.  Specification of Letters Patent.  Patented Feb. 28, 1911.

Application filed March 23, 1910. Serial No. 551,177.

*To all whom it may concern:*

Be it known that I, WALTON W. BEALS, a citizen of the United States, and resident of New York city, in the county of New York and State of New York, have invented certain new and useful Improvements in Containers, of which the following is a specification.

This invention relates to containers for toilet preparations or other articles and particularly articles in powder or paste form, such as talcum powder, tooth powder, salt, pepper, etc.

The object of the invention is to provide an improved means for controlling the discharge of the contents of the container, which will be simple and effective in operation, and which may be readily opened to permit the discharge of said contents in small quantities, or closed tightly, to retain said contents; also to prevent air passing through the valve openings and destroying valuable properties of said contents, as well as to retain the perfume within the container.

The invention consists in certain novel features of construction and arrangement of parts hereinafter described and pointed out in the claims.

A desirable embodiment of my invention is illustrated in the accompanying drawings in which similar reference characters indicate corresponding parts in the several views.

Figure 2:
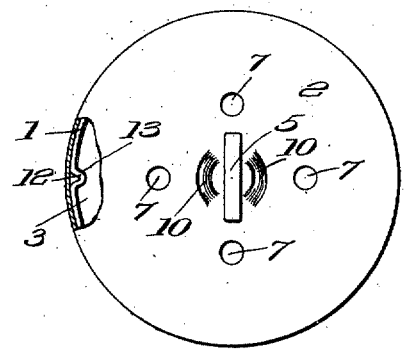
Figure 3:
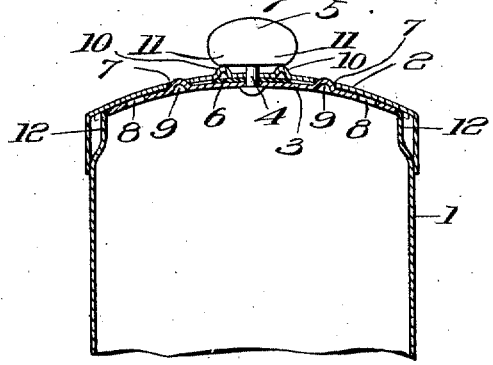
Figure 4:
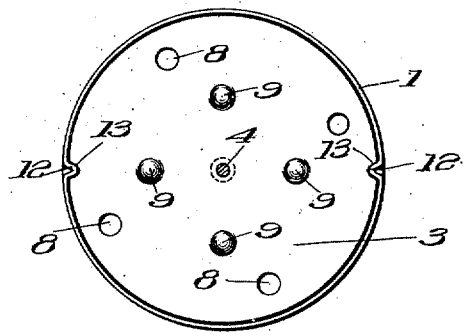
Figure 5:
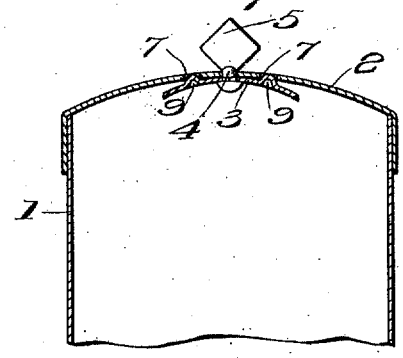
Figure 6:
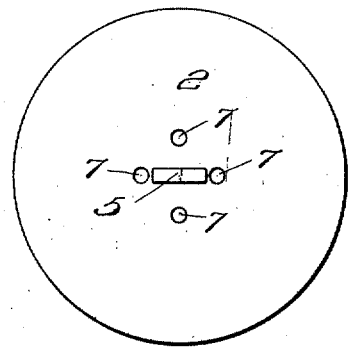
Figure 7:
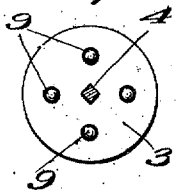

Figure 1 is a vertical section of a container embodying my invention; Fig. 2 is a plan view of Fig. 1, partly broken; Fig. 3 is a view similar to Fig. 1 but with parts of the container shown in a different position from that shown in Fig. 1; Fig. 4 is a plan view with the cover of the container removed; Fig. 5 is a vertical sectional view of a container embodying a modification of my invention; Fig. 6 is a plan view of Fig. 5, and Fig. 7 is a detail view of one of the valve members of the container shown in Fig. 5.

The body 1 of the container, which may be of any suitable shape, is provided with a cover 2 which is preferably convex in shape. Located within the container is the valve member 3 mounted freely on pin 4, which extends through said cover and is provided at its outer end with the knob 5. Between said cover and valve member is arranged an elastic member 6 which tends to force the valve member away from the cover and thereby open the valve as will be hereinafter more fully set forth. Said member preferably consists of a washer, which surrounds the pin 4, and is formed of rubber or other elastic material. The cover 2 is provided with openings 7 and the valve member 3 is provided with openings 8, forming passageways through which the contents of the container are discharged, the openings 7 being shown out of register with the openings 8. Upon the valve member 3 are formed projections 9 which enter the openings 7 in the cover 2 and fit tightly therein, when the valve member is drawn against the cover, thus closing the outlets 7 and preventing the escape of the contents of the container. Upon the cover 2 are formed the cam surfaces 10 adapted to be engaged by the cam arms 11, 11, preferably formed integral with the knob 5, but may be arranged independent thereof if desirable. The cam surfaces 10 are inclined from their highest points to the level of the cover, so that the arms 11 will ride smoothly thereon. The body 1 of the container is provided with tongues 12 adapted to engage notches 13 in the valve member 3 whereby said member is held in alinement while permitting longitudinal movement, or the valve member 3 may be provided with tongues and the body with notches.

To close the valve to prevent the escape of the contents of the container, and to prevent the admission of air therein, it is only necessary to rotate the knob 5 one quarter of a turn, during which movement the arms 11 engage the cams 10, whereupon the valve member 3 is drawn toward the cover 2 against the tension of the elastic member 6 until the outward portions of said valve member are brought tightly against the cover 2 or the projections 9 are seated firmly in the openings 7 of the cover, as shown in Fig. 3 of the drawing.

To open the valve it is only necessary to turn the knob 5 until the arms 11 are out of engagement with the cams 10, in which position the elastic member 6 will have forced the valve member back into the position shown in Fig. 1, or the washer 6 may be done away with and pressure on the knob accomplishes the same effect, so that when the container is inverted the contents thereof may travel first through the openings 8, then down the inclined inner surface of the cover 2 and then out through the openings 7. Washer 6 also serves to prevent escape of powder through openings in which pin 4 is located.

In the modification shown in Figs. 5, 6 and 7 of the drawing, the valve member 3 is shown smaller in diameter than the valve member of the other form of my invention, and the elastic member 6, openings 8, cams 10 and arms 11 are omitted. The knob 5 is secured rigidly to the valve member, which is held directly against the cover 2, so that the valve member will rotate with said knob when the knob is rotated to open and close the valve.

The valve member is formed of flexible material so that when the knob is turned to close the valve and the projections 9 are brought into registration with the openings 7 said projections will snap into the openings 7 and fit tightly therein, and when the knob is turned to open the valve the valve member will yield sufficiently to allow the projections 9 to pass under the cover 2.

Having now described my invention what I claim is:—

1. The combination with a container body, of a cover for one end of said body provided with openings, a valve member within the container provided with projections adapted to be seated in said openings to close the valve, a cam on the cover, and means connected with said valve member and coacting with said cam for moving said valve member to seat and unseat said projections to open and close the valve.

2. The combination with a container body, of a cover for one end of said body provided with openings, a valve member within the container provided with outwardly disposed projections adapted to be seated in said openings to close the valve, a cam on the cover, and rotatable means connected with the valve member for moving said valve member to seat or unseat said projections, to open and close the valve.

3. The combination with a container body, of a cover for one end of said body provided with openings, a valve member provided with projections adapted to be seated in said openings to close the same, arms connected to said valve member, cams on said cover adapted to be engaged by said arms to move the valve member toward said cover to seat said projections in said openings, and means for moving said valve member away from said cover to unseat said projections to open the valve, and to hold it in such position.

4. The combination with a container body, of a cover for one end of said body provided with openings, a valve member provided with projections adapted to be seated in said openings to close the same, arms connected to said valve member, cams on said cover adapted to be engaged by said arms to move the valve member toward said cover to seat said projections in said openings, means for moving said valve member away from said cover to unseat said projections to open the valve and to hold it in such position, and a finger piece for rotating said arms to open and close the valve.

5. The combination with a container body, of a cover for one end of said body provided with openings, a valve member provided with projections adapted to be seated in said openings, a pin projecting through said cover upon which said valve member is loosely mounted to permit rotation of the pin independently of said valve member, means to prevent rotation of said member to maintain said projections in alinement with said openings, arms connected with said pin, cams on said cover to be engaged by said arms, whereby said valve member is moved toward said cover to seat said projections in said cover openings, and means for moving said valve member away from said cover to unseat said projections to open the valve.

6. The combination with a container body, of a cover for one end of said body provided with valve openings, a valve member provided with projections adapted to be seated in said openings, a cam on the cover, and a pin journaled in the cover and valve member provided with projections adapted to be the cam for moving said valve member toward the cover to seat said projections in said openings to close the valve, and to permit the valve member to move away from the cover when said means of said pin is out of coaction with said cam.

7. The combination with a container body, of a cover for one end of said body provided with openings near its center, a valve member provided with projections adapted to be seated in said openings to close the valve, a pin journaled in the cover and valve member and having arms rotatable over the cover, and cams on the cover on opposite sides of the pin to coact with said arms to operate the valve member.

8. The combination of a container having a cover provided with openings, a valve member having projections to coact with said openings, a pin journaled in the cover and valve member, means coacting with the pin as it rotates to seat said projections in said openings, and means to prevent rotation of said valve member.

9. The combination of a container having a cover provided with openings, a valve member having projections to coact with said openings and having openings out of line with the first named openings, and an elastic member interposed between the cover and the valve member serving to separate them.

10. The combination with a container having a cover provided with openings, a valve member within the container having projections to coact with said openings, and means without the container connected with said member and rotatable in said cover to cause said projections to close and open said openings.

Signed at New York city, in the county of New York, and State of New York, this 22nd day of March, A. D. 1910.

WALTON W. BEALS.

Witnesses:
MARIE F. WAINWRIGHT,
RALPH H. RAPHAEL.

Copies of this patent may be obtained for five cents each, by addressing the "Commissioner of Patents, Washington, D. C."